US009200157B2

(12) United States Patent
El-Hibri et al.

(10) Patent No.: US 9,200,157 B2
(45) Date of Patent: *Dec. 1, 2015

(54) AROMATIC POLYCARBONATE COMPOSITION

(75) Inventors: Mohammad Jamal El-Hibri, Atlanta, GA (US); Leslie J. Myrick, Poplarville, MS (US); David B. Thomas, Poplarville, MS (US); Roy L. Carter, Chicago, IL (US); Nikica Maljkovic, New Orleans, LA (US); Christopher Davis, Diamondhead, MS (US); Scott A. Harding, Slidell, LA (US)

(73) Assignee: SOLVAY ADVANCED POLYMERS, L.L.C., Alpharetta, GA (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/438,968

(22) PCT Filed: Mar. 6, 2007

(86) PCT No.: PCT/EP2007/052079
§ 371 (c)(1),
(2), (4) Date: Feb. 26, 2009

(87) PCT Pub. No.: WO2008/028695
PCT Pub. Date: Mar. 13, 2008

(65) Prior Publication Data
US 2010/0016518 A1    Jan. 21, 2010

Related U.S. Application Data

(60) Provisional application No. 60/842,367, filed on Sep. 6, 2006, provisional application No. 60/842,365, filed on Sep. 6, 2006, provisional application No. 60/842,368, filed on Sep. 6, 2006.

(51) Int. Cl.
  *C08L 65/02* (2006.01)
  *C08L 69/00* (2006.01)
  *C08G 61/10* (2006.01)
  *B29C 45/00* (2006.01)
  *C08L 65/00* (2006.01)

(52) U.S. Cl.
  CPC .............. *C08L 65/00* (2013.01); *B29C 45/00* (2013.01); *C08G 61/10* (2013.01); *C08L 65/02* (2013.01); *C08L 69/00* (2013.01); *C08G 2261/312* (2013.01)

(58) Field of Classification Search
  None
  See application file for complete search history.

(56) References Cited

U.S. PATENT DOCUMENTS

| 2,991,273 A | 7/1961 | Hechelhammer et al. |
| 2,999,835 A | 9/1961 | Goldberg |
| 2,999,846 A | 9/1961 | Schnell et al. |
| 3,028,356 A | 4/1962 | Shepard |
| 3,028,365 A | 4/1962 | Schnell et al. |
| 3,148,172 A | 9/1964 | Fox |
| 3,153,008 A | 10/1964 | Fox |
| 3,271,367 A | 9/1966 | Schnell et al. |
| 3,365,517 A * | 1/1968 | Barth ............................ 525/462 |
| 3,544,514 A | 12/1970 | Schnell et al. |
| 3,659,779 A | 5/1972 | Berkman et al. |
| 3,912,688 A | 10/1975 | Schiller et al. |
| 4,228,218 A | 10/1980 | Takayanagi et al. |
| 5,227,457 A | 7/1993 | Marrocco et al. |
| 5,539,048 A | 7/1996 | Gagne et al. |
| 5,565,543 A | 10/1996 | Marrocco et al. |
| 5,646,231 A | 7/1997 | Marrocco et al. |
| 5,654,392 A | 8/1997 | Marrocco et al. |
| 5,659,005 A | 8/1997 | Marrocco et al. |
| 5,668,245 A | 9/1997 | Marrocco et al. |
| 5,670,564 A | 9/1997 | Gagne et al. |
| 5,721,335 A | 2/1998 | Marrocco et al. |
| 5,756,581 A | 5/1998 | Marrocco et al. |
| 5,760,131 A | 6/1998 | Marrocco et al. |

(Continued)

FOREIGN PATENT DOCUMENTS

| DE | 1570533 A1 | 8/1967 |
| DE | 1570533 A * | 1/1970 |

(Continued)

OTHER PUBLICATIONS

Shin et al., "Scratch Resistant Polycarbonate based alloy for transparent applications," Samyang Corp. Advanced Polymeric Materials R&D Center, 2011, 14 pages.* Definitive Rules for Nomenclature of Organic Chemistry, 1957, 44 pages.*
Bayer Polmers, Makrolon DP1-1848 Polycarbonate Copolymer Resin, May 2003, 4 pages.*
Standard Test Methods for Flexural Properties of Unreinforced and Reinforced Plastics and Electrical Insulating Materials, ASTM D 790-03, Jul. 18, 2008, 12 pages.*
Standard Test Methods for Determining the Izod Pendulum Impact Resistance of Plastics, ASTM D 256-05a, Jul. 18, 2008, 21 pages.*
Standard Test Method for Tensile Properties of Plastics, ASTM D 638-03, Jul. 22, 2008, 16 pages.*
GE Plastics, Lexan EXL9330 PC-Siloxane copolymer, 1997-2003, 5 pages.*

(Continued)

*Primary Examiner* — Robert Sellers
(74) *Attorney, Agent, or Firm* — Oblon, McClelland, Maier & Neustadt, L.L.P.

(57) ABSTRACT

Blend (B) comprising:
  at least one aromatic polycarbonate (P1), and
  at least one polyarylene (P2), more than 50 wt. % of the recurring units thereof are optionally substituted arylene groups [recurring units (R2)], each of said recurring units (R2) being linked by each of its two ends to two other optionally substituted arylene groups via a direct C—C linkage, and said recurring units (R2) being a mix (M) consisting of:
  between 0 and 75 mole %, based on the total number of moles of recurring units (R2), of rigid rod-forming arylene units (R2a), optionally substituted by at least one monovalent substituting group, with
  between 25 and 100 mole %, based on the total number of moles of recurring units (R2), of kink-forming arylene units (R2b), optionally substituted by at least one monovalent substituting group.
Article or part of an article comprising the blend (B).

16 Claims, No Drawings

(56) References Cited

U.S. PATENT DOCUMENTS

| | | | |
|---|---|---|---|
| 5,824,744 | A | 10/1998 | Gagne et al. |
| 5,827,927 | A | 10/1998 | Gagne et al. |
| 5,830,945 | A | 11/1998 | Gagne et al. |
| 5,869,592 | A | 2/1999 | Gagne et al. |
| 5,886,130 | A * | 3/1999 | Trimmer et al. ............ 528/171 |
| 6,087,467 | A | 7/2000 | Marrocco et al. |
| 6,586,554 | B1 | 7/2003 | Takahashi |
| 2006/0207464 | A1 | 9/2006 | Maljkovic et al. |
| 2008/0293840 | A1 | 11/2008 | Maljkovic et al. |
| 2008/0312387 | A1 | 12/2008 | Maljkovic et al. |
| 2009/0036594 | A1 | 2/2009 | Maljkovic et al. |

FOREIGN PATENT DOCUMENTS

| | | | |
|---|---|---|---|
| DE | 2113374 | A * | 10/1971 |
| DE | 2113374 | A1 | 10/1971 |
| DE | 2116974 | A * | 10/1972 |
| DE | 2116974 | A1 | 10/1972 |
| DE | 4015542 | A1 * | 11/1991 |
| EP | 436011 | A2 * | 7/1991 |
| EP | 436111 | A2 | 7/1991 |
| GB | 885442 | A * | 12/1961 |
| GB | 1079821 | A * | 8/1967 |
| GB | 1368338 | A | 4/1972 |
| GB | 1368338 | A * | 9/1974 |
| WO | WO 93/18076 | A1 * | 9/1993 |
| WO | WO9318076 | A1 | 9/1993 |
| WO | WO 2006/094987 | A1 * | 9/2006 |
| WO | WO2006094987 | A1 | 9/2006 |
| WO | WO 2007/101845 | A2 * | 9/2007 |
| WO | WO 2007/101852 | A2 * | 9/2007 |
| WO | WO 2007/101858 | A2 * | 9/2007 |
| WO | WO2007101845 | A2 | 9/2007 |
| WO | WO2007101852 | A2 | 9/2007 |
| WO | WO 2007101858 | A2 | 9/2007 |

OTHER PUBLICATIONS

Standard Test Method for High Speed Puncture Properties of Plastics Using Load and Displacement Sensors, ASTM D 3763-06, Jul. 22, 2008, 10 pages.*
Zoller et al., "Pressure-Volume-Temperature Properties of Blends of Poly(2,6-dimethyl-1,4-phenylene Ether) with Polystyrene," Journal of Polymer Science, vol. 20, 1982, pp. 1385-1397.*
Marrocco et al., Poly-X Self Reinforced Polymers: Processible Molecular Composites, International SAMPE Symposium, Apr. 11-14, 1994, pp. 1063-1072.*
Ha et al., "Miscible blends of poly(benzoyl paraphenylene) and polycarbonate," Polymer, vol. 42, 2001, pp. 6463-6472.*
Plastics Technology 'Self-Rinforcing' Thermoplastic Is Harder, Stronger, Stiffer Without Added Fibers, 2003, 2 pages.*
Ha et al., Investigation of the Phase Behavior of Blends of Poly(Benzoyl Paraphenylene) and Various Thermoplastics, ANTEC, 2000 pp. 2532-2537.*
Standard Test Method for Melt Flow Rates of Thermoplastics by Extrusion Plastometer, ASTM D 1238-04, Jul. 5, 2004, 14 pages.*
Akiyama et al., "Fabrication of Polycarbonate and Poly(phenylene) Blend Films," Polymer Preprints, vol. 54, No. 2, 2005, p. 3588.*
Randic, Aromaticity of Polycyclic Conjugated Hydrocarbons, Chem. Rev. vol. 103, 2003, pp. 3449-3605.*
Confidential Sales Information (1 p.), 2011, one page.
Shin H.C. et al., "Scratch resistant polycarbonate based alloy for transparent applications", SPE Asia Conference (20060608), 14 pp.
Weast R.C., "Definitive rules for nomenclature of organic chemistry", CRC Handbook of Chemistry and Physics, 64th edition, (1983-1984), p. C1-C44, CRC Press Inc., Boca Raton, Florida (44 p.).
Randic M., "Aromaticity of Polycyclic Conjugated Hydrocarbons", Chemical Reviews (2003), vol. 103, p. 3449-3605, American Chemical Society (158 p.).
Bayer, Datasheet "Makrolon® DP1-1848, Polycarbonate Copolymer Resin", 1997-2003, 4 pp.
Standard ASTM D790, Historical 2003, "Test Methods for Flexural Properties of Unreinforced and Reinforced Plastics and Electrical Insulating Materials", p. 1-11 (12 p.).
Standard ASTM D256, Historical 2005 Revision A, "Test Methods for Determining the Izod Pendulum Impact Resistance of Plastics", p. 1-20 (21 p.).
Standard ASTM D638, Historical 2003, "Test Method for Tensile Properties of Plastics", p. 1-15 (16 p.).
GE Plastics, Datasheet "Lexan® EXL9330", 2003, 5 pp.
Standard ASTM D3763, 2006, "Test Method for High Speed Puncture Properties of Plastics Using Load and Displacement Sensors", p. 1-9 (10 p.).
Zoller P. et al., "Pressure-Volume-Temperature Properties of Blends of Poly(2,6-dimethyl-1,4-phenylene Ether) with Polystyrene", Journal of Polymer Science : Polymer Physics Edition (1982), 20, p. 1385-97, John Wiley & Sons, Inc. (14 p.).
Marrocco M. et al., "Poly-X(TM) self reinforced polymers : processible molecular composites", 39th International SAMPE Symposium and Exhibition (Apr. 11-14, 1994), p. 1063-72, Society for the Advancement of Material and Process Engineering (10 p.).
Ha Y.-H. et al., "Miscible blends of poly(benzoyl paraphenylene) and polycarbonate", Polymer (2001), 42(15), p. 6463-72, Elsevier Science Ltd. (10 p.).
Naitove M.N., "Self-reinforcing thermoplastic is harder, stronger, stiffer without added fibers", Plastics Technology (Jul. 2003), Gardner Publications Inc. (2 p.).
Ha Y.-H. et al., "Investigation of the phase behaviour of blends of poly(benzoyl paraphenylene) and various thermoplastics", 58th ANTEC-SPE (2000), vol. 2, p. 2532-7, SPE (6 p.).
Standard ASTM D4812, 2006, "Test Method for Unnotched Cantilever Beam Impact Resistance of Plastics", p. 1-12.
Standard ASTM D1238, 2004, "Standard Test Method for Melt Flow Rates of Thermoplastics by Extrusion Plastometer", p. 1-13.
Kentaro A. et al., "Fabrication of Polycarbonate and Poly(phenylene) Blend Films", Polymer Preprints Japan, Society of Polymer Science, 54th SPDJ Symposium on Marcomolecules (2005), vol. 54(2), p. 3588.
PCT International Search Report dated Dec. 27, 2007 for International Application No. PCT/EP2007/052079 (3 pp.).
Confidential Sales Information (1 p.), Feb. 18, 2005.

* cited by examiner

AROMATIC POLYCARBONATE COMPOSITION

CROSS-REFERENCE TO RELATED APPLICATIONS

The present application is a U.S. national stage application under 35 U.S.C. §371 of International Application No. PCT/EP2007/052079 filed Mar. 6, 2007, which claims the benefit of (i) U.S. provisional application No. 60/842,367 filed Sep. 6, 2006, (ii) U.S. provisional application No. 60/842,368 filed Sep. 6, 2006, and (iii) U.S. provisional application No. 60/842,365 filed Sep. 6, 2006, the whole content of all of them these applications being herein incorporated by reference for all purposes.

FIELD OF THE INVENTION

The present invention relates to a new aromatic polycarbonate composition, and to articles and parts of articles made thereof.

BACKGROUND OF THE INVENTION

Aromatic polycarbonates form a class of thermoplastic polymers that offer some excellent engineering properties such as high stiffness, good melt processability, good elongation properties and high impact resistance. On the other hand, they have some limitations in strength and environmental stress cracking resistance, and, to a lesser extent, in fire resistance (as typically quantified by the burn time). In certain demanding industries, the level of properties achieved by aromatic polycarbonates in terms of strength and environmental stress cracking resistance is insufficient. In certain still more demanding applications which may be found in industries like commercial aviation and other civil transport, an increased fire resistance is needed, as well as a still higher strength.

Polyarylenes, especially polyphenylenes, exhibit an exceptionally high strength; they exhibit also an exceptionally high hardness, scratch resistance and dimensional stability. As concerns these properties, the level of properties achieved by neat polyarylenes usually exceeds by far that required by the most severe end uses. Unfortunately, polyarylenes have serious limitations in toughness-related properties, in particular in terms of impact resistance and elongation properties.

To meet the primary need for increased strength and environmental stress cracking resistance, it has already been tried to blend aromatic polycarbonates with certain classes of polyarylenes, in particular with Parmax® 1000 and Parmax® 1200 polyphenylenes (Parmax® 1200 is now commercialized by SOLVAY ADVANCED POLYMERS under the trade name PRIMOSPIRE™ PR-120). While, in these aromatic polycarbonate-polyarylene blends of the prior art, the polyarylene provides indeed a higher level of strength (which meets sometimes the requirements set by the application), these blends have still essentially the same limitations in terms of environmental cracking resistance. Besides, as the skilled in the art may have have dreaded in the light of the properties of neat polyarylenes, the prior art aromatic polycarbonate-polyarylene blends suffer from some limitations in terms of elongation properties and impact resistance; also, they have rather poor, or even poor, melt compatibility and processability, which probably explains why the skilled person generally prepared them by solution blending. Finally, no fire resistance increase is obtained; to the contrary, the blends polycarbonate-Parmax® 1200 blends exhibit even a somewhat lower fire resistance.

Polymer blends have been widely taught and employed in the art. As broad as this statement may be, the blending of polymers remains an empirical art and the selection of polymers for a blend giving special properties is, in the main, an Edisonian-like choice. Certain attributes of polymer blends are more unique than others. The more unique attributes when found in a blend tend to be unanticipated properties. According to Zoller and Hoehn, Journal of Polymer Science, Polymer Physics Edition, vol. 20, pp. 1385-1397 (1982): "Blending of polymers is a useful technique to obtain properties in thermoplastic materials not readily achieved in a single polymer. Virtually all technologically important properties can be improved in this way, some of the more important ones being flow properties, mechanical properties (especially impact strength), thermal stability, and price. ( . . . ) Ultimately, the goal of such modeling and correlation studies should be the prediction of blend properties from the properties of the pure components alone. We are certainly very far from achieving this goal."

There remains a strong need for a polymer material offering a superior balance of properties, including at least part of, and preferably all, the following ones:

high strength, higher than that of prior art neat aromatic polycarbonates;

high stiffness, as high as that of prior art neat aromatic polycarbonates;

high environmental stress cracking resistance, higher than that of prior art neat aromatic polycarbonates and that of prior art aromatic polycarbonate-polyarylene blends;

fire resistance properties in progress with regard to those of the prior art aromatic polycarbonate-polyarylene blends;

impact resistance properties in progress with regard to those of the prior art aromatic polycarbonate-polyarylene blends, ideally approaching by certain aspects that of the neat aromatic polycarbonates;

elongation properties in progress with regard to those of the prior art aromatic polycarbonate-polyarylene blends;

good melt processability, in substantial progress when compared to that of the prior art aromatic polycarbonate-polyarylene blends.

Further, to be suitable for use in certain applications of the most demanding industries, such as commercial aviation and other civil transports, the polymer material should further offer:

very high strength, higher than that of prior art neat aromatic polycarbonates and that of the prior art aromatic polycarbonate-polyarylene blends;

very high fire resistance properties, higher than that of prior art neat aromatic polycarbonates and that of the prior art aromatic polycarbonate-polyarylene blends.

THE INVENTION

This need, and still other ones, are unexpectedly met by a blend (B) comprising an aromatic polycarbonate and a polyarylene of a specific type.

Thus, in its principal aspect, the present invention is directed to a blend (B) comprising:

at least one aromatic polycarbonate (P1), and at least one polyarylene (P2), more than 50 wt. % of the recurring units thereof are optionally substituted arylene groups [recurring units (R2)], each of said recurring units (R2) being linked by each of its two ends to two other optionally substituted arylene groups via a direct C—C linkage, and said recurring units (R2) being a mix (M) consisting of:

between 0 and 75 mole %, based on the total number of moles of recurring units (R2), of rigid rod-forming arylene units (R2a), optionally substituted by at least one monovalent substituting group, with between 25 and 100 mole %, based on the total number of moles of recurring units (R2), of kink-forming arylene units (R2b), optionally substituted by at least one monovalent substituting group.

Another aspect of the present invention is directed to a method for preparing the blend (B) as above described which comprises melt mixing the at least one aromatic polycarbonate (P1) with the at least one polyarylene (P2).

Still another aspect of the present invention is directed to a shaped article or a part of a shaped article comprising the blend (B) as above described, or prepared by the method as above described.

Still other aspects of the present invention are directed to the use, in the blend (B) as above described, of the polyarylene (P2) as fire-stabilizer additive of the aromatic polycarbonate (P1), in particular as burn time reducer of the aromatic polycarbonate (P1). According to this aspect, the blend of concern may be notably in the form of shaped articles or parts of shaped articles.

DETAILED DESCRIPTION OF THE INVENTION

Generally Applicable Preferences as Concerns the Amounts of Aromatic Polycarbonate (P1) and the Polyarylene (P2)

The weight of the aromatic polycarbonate (P1), based on the total weight of the blend (B), is advantageously above 30%, preferably above 50%, more preferably of at least 70% and still more preferably at least 75%. On the other hand, the weight of the aromatic polycarbonate (P1), based on the total weight of the blend (B), is advantageously of at most 99%, preferably of at most 95%, more preferably of at most 90% and still more preferably of at most 85%.

The weight of the polyarylene (P2), based on the total weight of the blend (B), is advantageously of at least 1%, preferably of at least 5%, more preferably of at least 10%, and still more preferably of at least 15%. On the other hand, the weight of the polyarylene (P2), based on the total weight of the blend (B), is advantageously below 70%, preferably below 50%, more preferably of at most 30% and still more preferably of at most 25%.

The weight of the polyarylene (P2), based on the combined weight of the aromatic polycarbonate (P1) and the polyarylene (P2), is advantageously of at least 1%, preferably of at least 5%, more preferably of at least 10%, and still more preferably of at least 15%. On the other hand, the weight of the polyarylene (P2), based on the combined weight of the aromatic polycarbonate (P1) and of the polyarylene (P2), is advantageously below 70%, preferably below 50%, more preferably of at most 30% and still more preferably of at most 25%.

The combined weight of the aromatic polycarbonate (P1) and of the polyarylene (P2), based on the total weight of the blend (B), is advantageously above 25%, preferably above 50%, more preferably above 80%, and still more preferably above 95%. Excellent results were obtained when the blend (B) consisted essentially of, or even consisted of, the aromatic polycarbonate (P1) and the polyarylene (P2).

Particular Embodiment with Other Preferences as Concerns the Amounts of Aromatic Polycarbonate (P1) and the Polyarylene (P2)

In this particular embodiment, the polyarylene (P2) is contained in the blend (B) in an amount higher than that of the aromatic polycarbonate (P1).

According to this particular embodiment:

the weight of the aromatic polycarbonate (P1), based on the combined weight of the aromatic polycarbonate (P1) and the polyarylene (P2), is advantageously of at least 1%, preferably at least 5%, more preferably at least 10%, still more preferably at least 20% and most preferably above 25%; on the other hand, the weight of the aromatic polycarbonate (P1), based on the total weight of the blend (B), is advantageously below 45%; examples of particularly suitable weight amounts of the aromatic polycarbonate (P1) are 30, 35 and 40%;

the weight of the aromatic polycarbonate (P1), based on the total weight of the blend (B), is advantageously of at least 1%, preferably of at least 5%, more preferably of at least 10%, still more preferably of at least 20% and most preferably above 25%; on the other hand, the weight of the aromatic polycarbonate (P1), based on the total weight of the blend (B), is advantageously of above 45%; examples of particularly suitable weight amounts of the aromatic polycarbonate (P1) are 30, 35 and 40%;

the weight of the polyarylene (P2), based on the total weight of the blend (B), is advantageously above 55%; on the other hand, the weight of the polyarylene (P2), based on the total weight of the blend (B), is advantageously of at most 99%, preferably of at most 95%; more preferably of at most 90%, still more preferably of at most 80% and most preferably below 75%; examples of particularly suitable weight amounts of the polyarylene (P2) are 60, 65 and 70%; and the combined weight of the aromatic polycarbonate (P1) and of the polyarylene (P2), based on the total weight of the blend (B), is advantageously above 25%, preferably above 50%, more preferably above 80%, and still more preferably above 90%.

The Aromatic Polycarbonate (P1)

The aromatic polycarbonate (P1) is any polymer of which more than 50 wt. % of the recurring units (R1) comprise at least one optionally substituted arylene group, as hereinafter defined for the polyarylene (P2), and at least one carbonate group (—O—C(=O)—O).

The arylene group contained in the recurring units (R1) is preferably chosen from phenylenes and naphthylenes.

The arylene group contained in the recurring units (R1) may be unsubstituted. Alternatively, the arylene group contained in the recurring units (R1) may be substituted by at least one substituting group. The substituting group is advantageously chosen from (s-1) $C_1$-$C_{20}$ alkyls, (s-2) $C_5$-$C_{15}$ cycloalkyls, (s-3) $C_1$-$C_{20}$ aryls, (s-4) $C_1$-$C_{20}$ alkylaryls, (s-5) $C_1$-$C_{20}$ aralkyls, (s-6) $C_1$-$C_{20}$ alkenyls, halogens, the partially halogenated homologous of radicals (s-1), (s-2), (s-3), (s-4), (s-5) and (s-6), and the perhalogenated homologous of radicals (s-1), (s-2), (s-3), (s-4), (s-5) and (s-6).

The recurring units (R1) may be chosen notably from those obtainable by the polycondensation reaction of diphenyl carbonate and at least one aromatic diol (D1), as hereinafter defined:

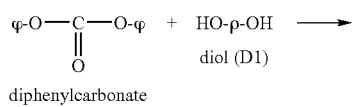

-continued $$\varphi\text{-O}\underset{\underset{O}{\|}}{-C}-\text{O-}\varphi\text{-O-}\rho\text{-O}-$$

recurring unit (R1)

φ being phenyl and p being a $C_6$-$C_{50}$ divalent radical.

The recurring units (R1) are preferably chosen from those obtainable by the polycondensation reaction of phosgene and at least one aromatic diol (D1):

$$\text{Cl}\underset{\underset{O}{\|}}{-C}-\text{Cl} + \text{OH-}\rho\text{-OH} \longrightarrow -\text{O}\underset{\underset{O}{\|}}{-C}-\text{O-}\rho\text{-}$$
phosgene     diol (D1)              recurring unit (R1)

ρ being a $C_6$-$C_{50}$ divalent radical.

An aromatic diol (D1) is any compound comprising two hydroxy groups and at least one optionally substituted arylene group.

The optionally substituted arylene group of the aromatic diol (D1) is preferably chosen from optionally substituted phenylenes and optionally substituted naphthylenes. If the aromatic diol (D1) contains several optionally substituted arylene groups, they are chosen independently from each other.

The arylene group of the aromatic diol (D1) may be unsubstituted. Alternatively, the arylene group of the aromatic diol (D1) may be substituted by at least one substituting group. The substituting group is advantageously chosen from (s-1), (s-2), (s-3), (s-4), (s-5), (s-6), halogens, the partially halogenated homologous of radicals (s-1), (s-2), (s-3), (s-4), (s-5) and (s-6), and the perhalogenated homologous of radicals (s-1), (s-2), (s-3), (s-4), (s-5) and (s-6). If several substituting groups substitute the same arylene group, the substituting groups are chosen independently from each other. Also, if the aromatic diol (D1) contains several substituted arylene groups, the substituting groups are chosen independently from one aromatic diol to another.

The aromatic diol (D1) from which the recurring units (R1) are obtainable by its polycondensation reaction with phosgene, is preferably chosen from aromatic diols conforming to the structural formulae (I) and (II), as shown herebelow:

(I)

HO—⟨phenylene⟩—(A)$_g$—⟨phenylene⟩—HO
       (Z)$_d$           (Z)$_d$      $_e$ (II)

HO—⟨naphthalene⟩—HO
   (Z)$_f$   (Z)$_f$ wherein:
A is chosen from $C_1$-$C_8$ alkylenes, $C_2$-$C_8$ alkylidenes, $C_5$-$C_{15}$ cycloalkylenes, $C_5$-$C_{15}$ cycloalkylidenes, carbonyl atom, oxygen atom, sulfur atom, —SO—, —SO$_2$— and radicals conforming to

[structure showing dimethyl-substituted phenyl group with two C(CH$_3$)$_2$ groups]

Z is chosen from (s-1), (s-2), (s-3), (s-4), (s-5) and (s-6) as above defined preferably Z is chosen from F, Cl, Br, I, $C_1$-$C_4$ alkyls; if several Z radicals are substituents, they may be identical or different from one another;
e denotes an integer from 0 to 1;
g denotes an integer from 0 to 1;
d denotes an integer from 0 to 4; and
f denotes an integer from 0 to 3.

Among the aromatic diols (D1) are: hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, 2,2,4-trimethylcyclohexyl-1,1-diphenol and α,α-bis-(hydroxyphenyl)-diisopropylbenzenes, as well as their nuclear-alkylated compounds. These and further aromatic diols (D1) are described, for example, in U.S. Pat. Nos. 3,028,356; 2,999,835; 3,148,172; 2,991,273; 3,271,367; and 2,999,846, all incorporated herein by reference.

Further examples of aromatic diols from which the recurring units (R1) are obtainable are the following bisphenols: 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-ydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene, 2,2,4-trimethyl cyclohexyl-1,1-diphenol and 4,4'-sulfonyl diphenol.

All the above cited aromatic diols (D1) are more preferred.

Still more preferred aromatic diols are chosen from the following list: 2,2-bis-(4-hydroxyphenyl)-propane, 2,2-bis-(3,5-dimethyl-4-hydroxyphenyl)-propane, 2,2,4-trimethyl cyclohexyl-1,1-diphenol and 1,1-bis-(4-hydroxy-phenyl)-cyclohexane.

The most preferred aromatic diol from which the recurring units (R1) are obtainable is 2,2-bis-(4-hydroxyphenyl)-propane (bisphenol A).

The polycarbonate (P1) of the invention may entail in its structure recurring units (R1) obtainable from phosgene and one and only one aromatic diol. Alternatively, the polycarbonate (P1) of the invention may entail in its structure recurring units (R1) obtainable from phosgene and two, three or more than three aromatic diols.

Among the aromatic polycarbonates suitable in the practice of the invention as aromatic polycarbonates (P1) are included phenolphthalein-based polycarbonates, copolycarbonates and terpolycarbonates such as are described in U.S. Pat. Nos. 3,036,036 and 4,210,741, both incorporated by reference herein.

The aromatic polycarbonate (P1) may further comprise recurring units (R1*), different from recurring units (R1).

Recurring units (R1*) may be notably those recurring units obtainable by the polycondensation reaction of phosgene and at least one $C_1$-$C_{20}$ aliphatic, such as ethylene glycol, neopentylglycol, 1,4-butanediol and 1,5-hexanediol.

Recurring units (R1*) may also be those recurring units obtainable by the polycondensation reaction of at least one diacid, such as adipic acid, terephthalic acid and isophthalic acid, and at least one diol chosen from $C_1$-$C_{20}$ aliphatic diols and aromatic diols such, identical to above described aromatic diols (D1). Among these recurring units (R1*), those recurring units obtainable by the polycondensation reaction of terephthalic acid and/or isophthalic acid, and at least one aromatic diol (D1), are preferred.

Preferably more than 75 wt. % and more preferably more than 90 wt. % of the recurring units of the aromatic polycarbonate (P1) are recurring units (R1). Still more preferably, essentially all, if not all, the recurring units of the aromatic polycarbonate (P1) are recurring units (R1).

Excellent results were obtained with LEXAN® 104 polycarbonate, available from General Electric.

The aromatic polycarbonate (P1) of the invention may be free of branching; alternatively, it may also be branched, in particular by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxy-phenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopro-pylidine)-phenol; 2,6-bis-(2'-dihydroxy-5'-methylbenzyl).sub.4-methyl-phenol; 2,4-dihydroxybenzoic acid; 2-(4-hydroxyphenyl)-2-(2,4-dihydroxy-phenyl)-propane and 1,4-bis-(4,4'-dihydroxy-triphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

The aromatic polycarbonate (P1) is preferably unbranched.

The aromatic polycarbonate (P1) can be semi-crystalline (i.e. it has a melting point) or amorphous (i.e. it has no melting point). It is preferably amorphous.

The aromatic polycarbonate (P1) can be prepared by any suitable method.

Suitable methods for the preparation of the polycarbonate (P1) include polycondensation in a homogeneous phase and transesterification. Suitable methods are disclosed in the incorporated herein by reference U.S. Pat. Nos. 3,028,365; 2,999,846; 3,153,008; and 2,991,273. The preferred method for the preparation of polycarbonate (P1) is the interfacial polycondensation method, wherein the recurring units (R1) are obtained by the polycondensation reaction of a carbonic acid derivative, in particular phosgene, and at least one aromatic diol (D1):

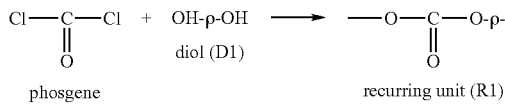

ρ being a $C_6$-$C_{50}$ divalent radical.

Still other suitable methods of synthesis in forming the polycarbonate (P1) are disclosed in U.S. Pat. No. 3,912,688, incorporated herein by reference.

Aromatic polycarbonates suitable as the aromatic polycarbonate (P1) are available on the market. For instance, LEXAN® 104 polycarbonate is a bisphenol A polycarbonate, commercially available from General Electric. Other suitable aromatic polycarbonates are Makrolon CD 2005, Makrolon FCR 2400, Makrolon 2600, Makrolon 2800 and Makrolon 3200, all of which are bisphenol A based homopolycarbonates differing in terms of their respective molecular weights and characterized in that their melt flow indices (MFR) per ASTM D-1238 are about 60 to 85, 16.5 to 24, 13 to 16, 7.5 to 13.0 and 3.5 to 6.5 g/10 min, respectively. A branched polycarbonate such as Makrolon 1239 can also be used. All the Makrolon products are available from Bayer Material Science LLC, of Pittsburgh, Pa.

The aromatic polycarbonate (P1) may be in the form of pellets and/or powder.

The blend (B) can comprise one and only one aromatic polycarbonate (P1). Alternatively, it can comprise two, three, or even more than three aromatic polycarbonates (P1).

The Polyarylene (P2)

For the purpose of the present invention, an arylene group is a hydrocarbon divalent group consisting of one core composed of one benzenic ring or of a plurality of benzenic rings fused together by sharing two or more neighboring ring carbon atoms, and of two ends.

Non limitative examples of arylene groups are phenylenes, naphthylenes, anthrylenes, phenanthrylenes, tetracenylenes, triphenylylenes, pyrenylenes, and perylenylenes. The arylene groups (especially the numbering of the ring carbon atoms) were named in accordance with the recommendations of the CRC Handbook of Chemistry and Physics, 64$^{th}$ edition, pages $C_1$-$C_{44}$, especially p. C11-C12.

Arylene groups present usually a certain level of aromaticity; for this reason, they are often reported as "aromatic" groups. The level of aromaticity of the arylene groups depends on the nature of the arylene group; as thoroughly explained in Chem. Rev. 2003, 103, 3449-3605, "Aromaticity of Polycyclic Conjugated Hydrocarbons", the level of aromaticity of a polycyclic aromatic hydrocarbon can be notably quantified by the "index of benzene character" B, as defined on p. 3531 of the same paper; values of B for a large set of polycyclic aromatic hydrocarbon are reported on table 40, same page.

An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group. An end of an arylene group, or more precisely the linkage capable of being formed by said end, can be characterized by a direction and by a sense; to the purpose of the present invention, the sense of the end of an arylene group is defined as going from the inside of the core of the arylene group to the outside of said core. As concerns more precisely arylene groups the ends of which have the same direction, such ends can be either of the same or opposite sense; also, their ends can be in the straight foregoing of each other, or not (otherwise said, they can be disjoint).

The polyarylene (P2) is any polymer, other than the aromatic polycarbonate (P1) as above defined, of which more than 50 wt. % of the recurring units are recurring units (R2), wherein:

the recurring units (R2) are of one or more formulae consisting of an optionally substituted arylene group, and the optionally substituted arylene groups of which the recurring units (R2) consist, are linked by each of their two ends to two other optionally substituted arylene groups via a direct C—C linkage.

That the optionally substituted arylene groups are linked by each of their two ends to two other optionally substituted arylene groups via a direct C—C linkage, is an essential feature of the recurring units (R2); thus, if present in the polyarylene (P2), arylene recurring units which are linked by at least one of their two ends to a group other than an arylene group such as phenylene recurring units $\phi_1$, $\phi_2$ and $\phi_2$, below:

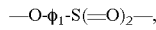

—O-$\phi_1$-S(=O)$_2$—,

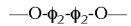

—O-$\phi_2$-$\phi_2$-O— are not recurring units (R2) in the sense of the present invention.

The optionally substituted arylene groups of which the recurring units (R2) consist, whatever they are rigid rod-forming arylene units (R2a) or kink-forming arylene units (R2b), can be unsubstituted. Alternatively, part of or all the optionally substituted arylene groups of which the recurring units (R2) consist, can be substituted by at least one monovalent substituting group.

The monovalent substituting group is usually not polymeric in nature; its molecular weight is preferably below 500, more preferably below 300, still more preferably below 200 and most preferably below 150.

The monovalent substituting group is advantageously a solubilizing group. A solubilizing group is one increasing the solubility of the polyarylene (P2) in at least one organic solvent, in particular in at least one of dimethylformamide, N-methylpyrrolidinone, hexamethylphosphoric triamide, benzene, tetrahydrofuran and dimethoxyethane, which can be used as solvents during the synthesis of the polyarylene (P2) by a solution polymerization process.

The monovalent substituting group is also advantageously a group which increases the fusibility of the polyarylene (P2), i.e. it lowers its glass transition temperature and its melt viscosity.

Preferably, the monovalent substituting group is chosen from:

hydrocarbyls such as alkyls, aryls, alkylaryls and aralkyls;
halogenos such as —Cl, —Br, —F and —I;
hydrocarbyl groups partially or completely substituted by at least one halogen atom such as halogenoalkyls, halogenoaryls, halogenoalkylaryls and halogenoaralkyls;
hydroxyl;
hydrocarbyl groups substituted by at least one hydroxyl group, such as hydroxyalkyls, hydroxyaryls, hydroxyalkylaryls and hydroxyaralkyls;
hydrocarbyloxys [—O—R, where R is a hydrocarbyl group], such as alkoxys, aryloxys, alkylaryloxys and aralkyloxys;
amino (—NH2);
hydrocarbyl groups substituted by at least one amino group, such as aminoalkyls and aminoaryls;
hydrocarbylamines [—NHR or —NR2, where R is a hydrocarbyl group] such as alkylamines and arylamines;
carboxylic acids and their metal or ammonium salts, carboxylic acid halides, carboxylic anhydrides;
hydrocarbyl groups substituted by at least one of carboxylic acids, metals or ammonium salts thereof, carboxylic acid halides and carboxylic anhydrides, such as —R—C(=O)OH where R is an alkyl or an aryl group;

hydrocarbylesters [—C(=O)OR or —O—C(=O)R, where R is a hydrocarbyl group] such as alkylesters, arylesters, alkylarylesters and aralkylesters amido [—C(=O)NH2];
hydrocarbyl groups substituted by at least one amido group;
hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR2 or —N—C(=O)R2, where R are a hydrocarbyl groups], such as dialkylamides and diarylamides;
sulfinic acid (—SO2H), sulfonic acid (—SO3H), their metal or ammonium salts,
hydrocarbylsulfones [—S(=O)2-R, where R is the hydrocarbyl group], such as alkylsulfones, arylsulfones, alkylarylsulfones, aralkylsulfones;
aldehyde [—C(=O)H] and haloformyls [—C(=O)X, wherein X is a halogen atom];
hydrocarbylketones [—C(=O)—R, where R is a hydrocarbyl group], such as alkylketones, arylketones, alkylarylketones and aralkylketones;
hydrocarbyloxyhydrocarbylketones [—C(=O)—R1-O—R2, where R1 is a divalent hydrocarbon group such as an alkylene, an arylene, an alkylarylene or an aralkylene, preferably a C1-C18 alkylene, a phenylene, a phenylene group substituted by at least one alkyl group, or an alkylene group substituted by at least one phenyl group; and R2 is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones;
any of the above groups comprising at least one hydrocarbyl group or a divalent hydrocarbon group R1, wherein said hydrocarbyl group or said R1 is itself substituted by at least one of the above listed monovalent substituting groups, e.g. an arylketone —C(=O)—R, where R is an aryl group substituted by one hydroxyl group;

where:
the hydrocarbyl groups contain preferably from 1 and 30 carbon atoms, more preferably from 1 to 12 carbon atoms and still more preferably from 1 to 6 carbon atoms;
the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;
the aryl groups are defined as monovalent groups consisting of one end and one core composed of one benzenic ring (such the phenyl group) or of a plurality of benzenic rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;
the aryl groups contain preferably from 6 to 30 carbon atoms; more preferably, they are phenyl groups;
the alkyl group which is contained in the alkylaryl groups meets the preferences of the alkyl groups as above expressed;
the aryl group which is contained in the aralkyl groups meets the preferences of the aryl groups as above expressed.

More preferably, the monovalent substituting group is chosen from hydrocarbylketones [—C(=O)—R, where R is a hydrocarbyl group] and hydrocarbyloxyhydrocarbylketones [—C(=O)—$R^1$—O—$R^2$, where $R^1$ is a divalent hydrocarbon group and $R^2$ is a hydrocarbyl group], said hydrocarbylketones and hydrocarbyloxyhydrocarbylketones being unsubstituted or substituted by at least one of the above listed monovalent substituting groups.

Still more preferably, the monovalent substituting group is chosen from arylketones and aryloxyarylketones, said arylketones and aryloxyarylketones being unsubstituted or substituted by at least one of the above listed monovalent substituting groups.

Most preferably, the monovalent substituting group is an (unsubstituted) arylketone, in particular it is phenylketone [—C(=O)-phenyl].

The core of the optionally substituted arylene group of the recurring units (R2), whatever they are rigid rod-forming arylene units (R2a) or kink-forming arylene units (R2b), is composed of preferably at most 3, more preferably at most 2, and still more preferably at most one benzenic ring. Then, when the core of the optionally substituted arylene group of the recurring units (R2) is composed of one benzenic ring, the recurring units (R2) consist of an optionally substituted phenylene group, provided said optionally substituted phenylene group is linked by each of its two ends to two other optionally substituted arylene groups via a direct C—C linkage.

As above explained, the optionally substituted arylene group of the recurring units (R2) is linked by each of its two ends to two other optionally substituted arylene groups via a direct C—C linkage. Preferably, it is linked by each of its two ends to two other optionally substituted phenylene groups via a direct C—C linkage.

Whenever meaningful, all the above expressed definitions and preferences, whatever their concern and whatever the level of preference expressed, can be applied independently from each other to the rigid rod-forming arylene recurring units (R2a) and to the kink-forming arylene recurring units (R2b).

As also above explained, both ends of the optionally substituted arylene group of the recurring units (R2) can be characterized notably by a direction and by a sense.

A first set of recurring units (R2) contained in the mix (M), is composed of optionally substituted arylene groups, the ends of which have the same direction, are of opposite sense, and are in the straight foregoing of each other

[rigid rod-forming arylene units (R2a)].

More precisely, the mix (M) comprises between 0 and 75 mole %, based on the total number of moles of recurring units (R2), of rigid rod-forming arylene units (R2a), which are optionally substituted by at least one monovalent substituting group.

Non limitative examples of such optionally substituted arylene groups include:

1,4-phenylene (also named p-phenylene) 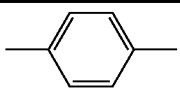

1,4-naphthylene 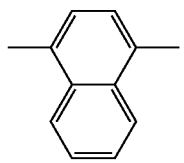

1,4-phenanthrylene and 2,7-phenanthrylene 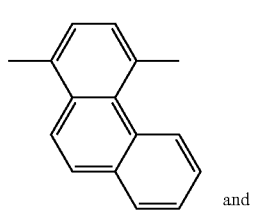 [SMILES: Cc1ccc(C)c2c1ccc1ccccc12] and 1,4-anthrylene and 9,10-anthrylene 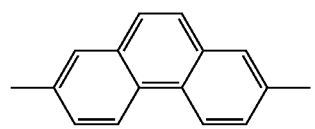

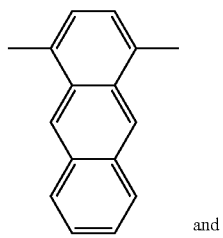 and 2,7-pyrenylene 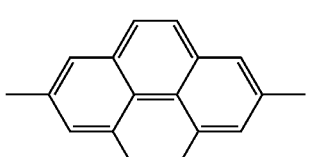

1,4-naphthacenylene and
5,12-naphthacenylene
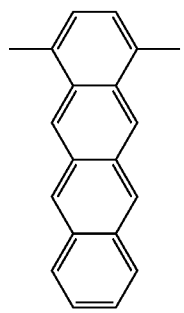
and
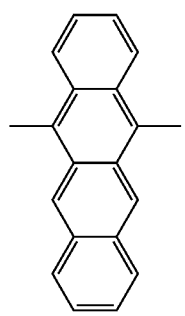
1,4-chrysenylene
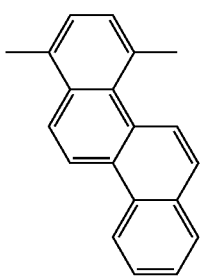 [SMILES: Cc1ccc(C)c2c1ccc1c3ccccc3ccc12]
1,4-triphenylylene and
2,7-triphenylylene
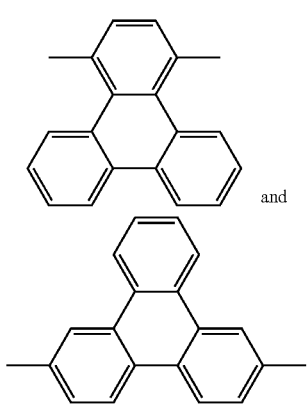
and
1,4-pentacenylene,
5,14-pentacenylene and
6,13-pentacenylene
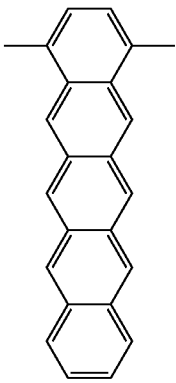
,
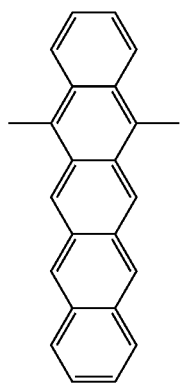
and
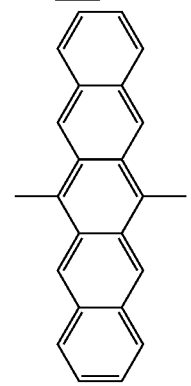
1,6-coronenylene
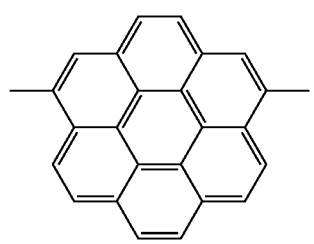

1,4-trinaphthylenylene,
2,9-trinaphthylenylene
and
5,18-trinaphthylenylene

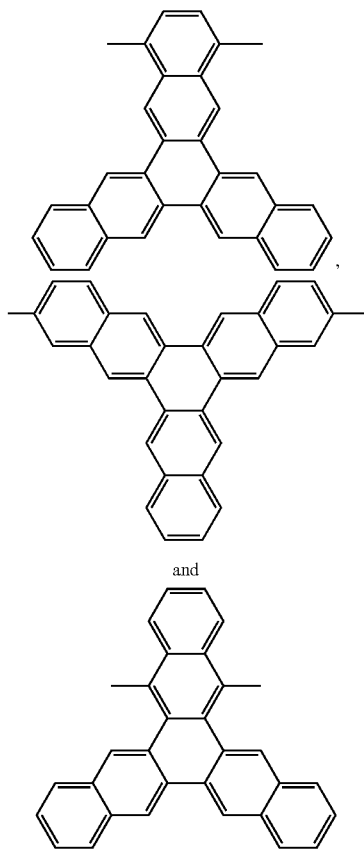

and and any of these groups substituted by at least one monovalent substituting group, as above defined, in particular by a phenylketone group.

Optionally substituted p-phenylenes are preferred as rigid rod-forming arylene units (R2a).

Generally speaking, rigid rod-forming arylene units, when contained in a polyarylene, result in straight polymer chains exhibiting an outstanding rigidity. For this reason, such polyarylenes are commonly referred to as "rigid-rod polymers". The polyarylene (P2), as it contains rigid rod-forming arylene units (R2a), can be qualified as a rigid-rod polyarylene.

A second set of recurring units (R2) contained in the mix (M), is composed of optionally substituted arylene groups, the ends of which
either have a different direction, forming thus together an angle between 0 and 180°, said angle being possibly acute or obtuse,
or have the same direction and the same sense,
or have the same direction, are of opposite sense and are disjoint (i.e. not in the straight foregoing of each other)
[globally hereafter referred to as kink-forming arylene units (R2b)].

More precisely, the mix (M) comprises between 25 and 100 mole %, based on the total number of moles of recurring units (R2), of kink-forming arylene units (R2b), which are optionally substituted by at least one monovalent substituting group.

A first subset of possible kink-forming arylene units (R2b) is composed of optionally substituted arylene groups, the ends of which have a different direction, forming together an acute angle [kink-forming arylene units (R2b-1)].

Non limitative examples of optionally substituted arylene groups the ends of which have a direction different from each other include 1,2-phenylene
(or o-phenylene)

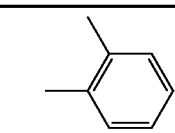

1,2-, 2,3- and
1,7-naphtylenes

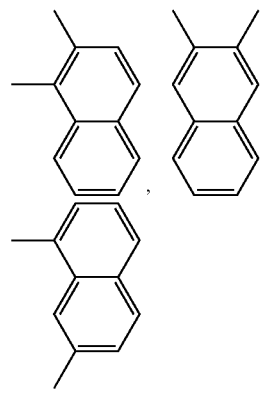

, and 1,2-, 1,8-, 1,9-,
2,3-, 2,5- and
2,10-phenanthrylenes

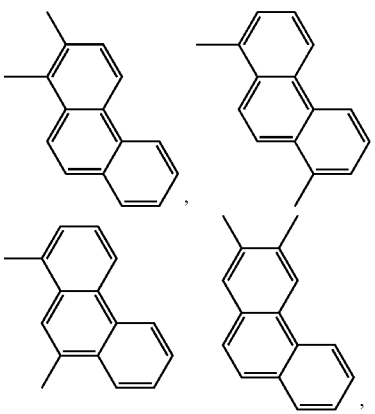

,   , and 1,2- and
1,7-anthrylenes

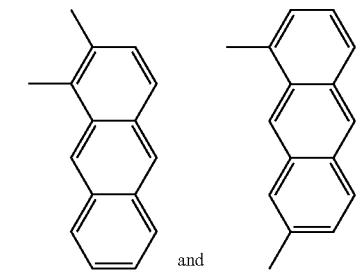

and and any of these groups substituted by at least one monovalent substituting group, as above defined, in particular by a phenylketone group.

A second subset of possible kink-forming arylene units (R2b) is composed of optionally substituted arylene groups, the ends of which have a different direction, forming together an obtuse angle [kink-forming units (R2b-2)]. Non limitative examples of optionally substituted arylene groups the ends of which have a direction different from each other include:

1,3-phenylene
(or m-phenylene)

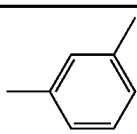

1,3- and
1,6-naphtylenes

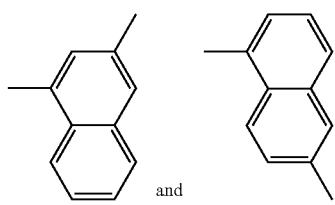
and 1,3-, 1,5-, 1,7-,
2,4-, 2,9- and
3,10-phenanthrylenes

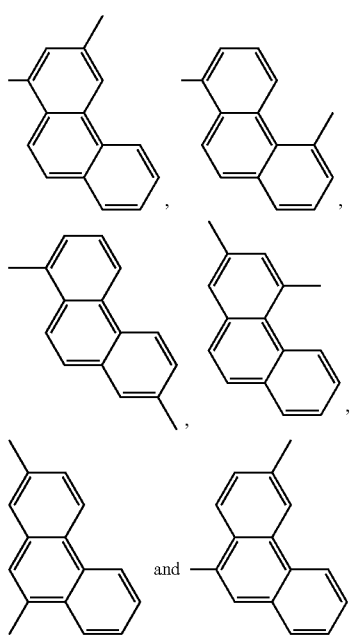
and 1,3- and
1,6-anthrylenes

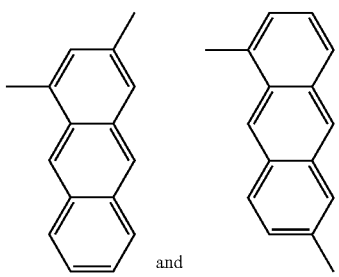
and and any of these groups substituted by at least one monovalent substituting group, as above defined, in particular by a phenylketone group.

A third subset of possible kink-forming arylene units (R2b) is composed of optionally substituted arylene groups, the ends of which have the same direction and the same sense [kink-forming arylene units (R2b-3)]. Non limitative examples of optionally substituted arylene groups the ends of which the same direction and the same sense include 1,8-naphthylene

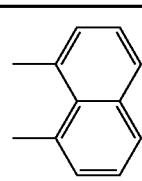

1,10- and 3,5-phenanthrylenes

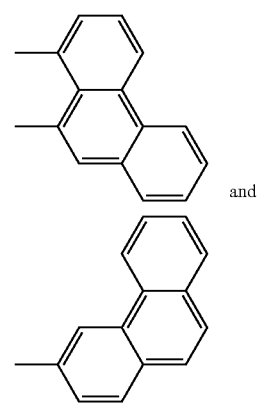
and 1,8- and 1,9-anthrylenes

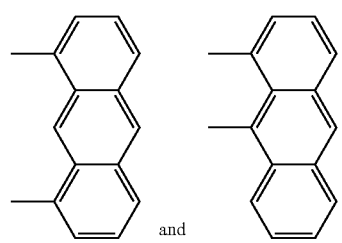
and and any of these groups substituted by at least one monovalent substituting group, as above defined, in particular by a phenylketone group.

A fourth subset of possible kink-forming arylene units (R2b) is composed of optionally substituted arylene groups, the ends of which have the same direction, are of opposite sense and are disjoint [kink-forming arylene units (R2b-4)]. Non limitative examples of such optionally substituted arylene groups include:

1,5- and 2,6-naphtylenes

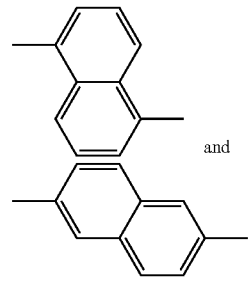
and 1,6-, 3,9- and
4,10-phenanthrylenes

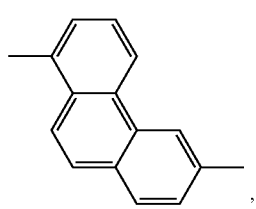
,

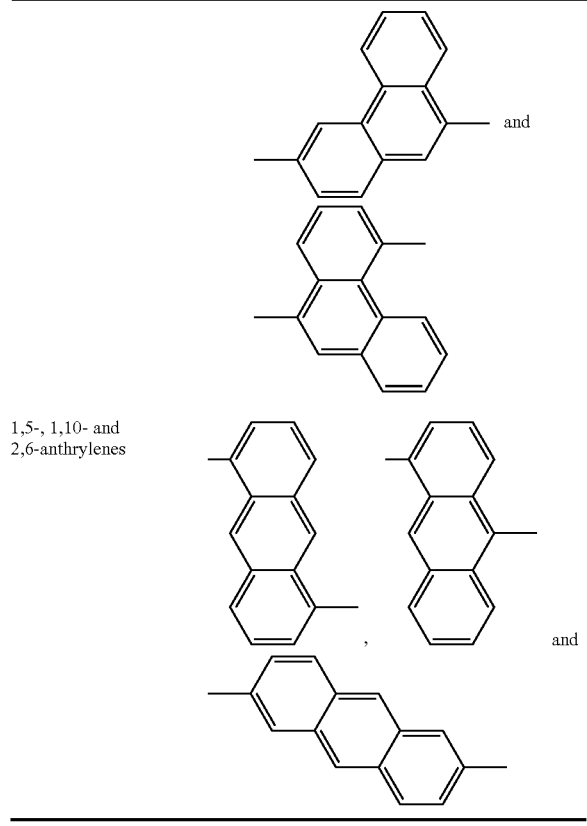

1,5-, 1,10- and 2,6-anthrylenes and any of these groups substituted by at least one monovalent substituting group, as above defined, in particular by a phenylketone group.

Preferably, the kink-forming arylene units (R2b) are chosen from kink-forming arylene units (R2b-1), kink-forming arylene units (R2b-2) and kink-forming arylene units (R2b-4). More preferably, the kink-forming arylene units (R2b) are chosen from kink-forming arylene units (R2b-1) and kink-forming arylene units (R2b-2). Still more preferably, the kink-forming arylene units (R2b) are chosen from kink-forming arylene units (R2b-1). Even still more preferably, the kink-forming arylene units (R2b) are optionally substituted m-phenylenes.

Generally speaking, kink-forming arylene units, when contained in a polyarylene, result in more or less kinked polymer chains, exhibiting a higher solubility and fusibility than straight polymer chains. The polyarylene (P2), as it contains kink-forming arylene units (R2b), can also be qualified as a "kinked polymer".

In the mix (M), the number of moles of the kink-forming arylene units (R2b), based on the total number of moles of the recurring units (R2), is preferably of at least 30%, more preferably at least 35%, still more preferably at least 40% and most preferably at least 45%. On the other hand, in the mix (M), the number of moles of the kink-forming arylene units (R2b), based on the total number of moles of the recurring units (R2), is preferably of at most 90%, more preferably at most 75%, still more preferably at most 65% and most preferably at most 55%.

The recurring units (R2) of the polyarylene (P2) are preferably a mix (M)=(M$^{1\Phi}$) consisting of:
between 0 and 75 mole %, based on the total number of moles of recurring units (R2), of rigid rod-forming arylene units (R2a) chosen from p-phenylenes optionally substituted by at least one monovalent substituting group,
with
between 25 and 100 mole %, based on the total number of moles of recurring units (R2), of kink-forming arylene units (R2b) chosen from (i) m-phenylenes optionally substituted by at least one monovalent substituting group and (ii) mixes of m-phenylenes with o-phenylenes, wherein both m-phenylenes and o-phenylenes are, independently from each other, optionally substituted by at least one monovalent substituting group.

Preferably, essentially all, if not all, the rigid rod-forming arylene units (R2a) of the mix (M)=(M$^{1\Phi}$) are p-phenylene units substituted by at least one monovalent substituting group. More preferably, essentially all, if not all, the rigid rod-forming arylene units (R2a) of the mix (M)=(M$^{1\Phi}$) are p-phenylenes substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the rigid rod-forming arylene units (R2a) of the (M)=(M$^{1\Phi}$) are p-phenylenes substituted by at least one monovalent substituting group chosen from arylketones and aryloxyarylketones, said arylketones and aryloxyarylketones being unsubstituted or substituted by at least one monovalent substituting group as those above listed. Most preferably, essentially all, if not all, the rigid rod-forming arylene units (R2a) of the (M)=(M$^{1\Phi}$) are p-phenylenes substituted by an arylketone group, in particular by the phenylketone group.

Essentially all, if not all, the kink-forming arylene units (R2b) of the mix (M)=(M$^{1\Phi}$) are m-phenylene units optionally substituted by at least one substituting group. More preferably, essentially all, if not all, the kink-forming arylene units (R2b) of the mix (M)=(M$^{1\Phi}$) are m-phenylene units which are optionally substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the kink-forming arylene units (R2b) of the (M)=(M$^{1\Phi}$) are unsubstituted m-phenylene units.

In the mix (M)=(M$^{1\Phi}$), the number of moles of the kink-forming arylene units (R2b), based on the total number of moles of the recurring units (R2), is preferably of at least 30%, more preferably at least 35%, still more preferably at least 40% and most preferably at least 45%. On the other hand, in the mix (M), the number of moles of the kink-forming arylene units (R2b), based on the total number of moles of the recurring units (R2), is preferably of at most 90%, more preferably at most 75%, still more preferably at most 65% and most preferably at most 55%.

Good results were obtained when the recurring units (R2) were a mix (M)=(M$^{1\Phi}$) consisting of p-phenylene units substituted by a phenylketone group with unsubstituted m-phenylene units, in a mole ratio of about 50:50.

The kinked rigid-rod polyarylene suitable for the presently invented use and articles may further comprise recurring units (R2*), different from recurring units (R2).

Recurring units (R2*) may contain or not at least one strong divalent electron withdrawing group linked on each of its ends to an arylene group. Non limitative examples of recurring units (R2*) free of such strong divalent electron withdrawing group are:

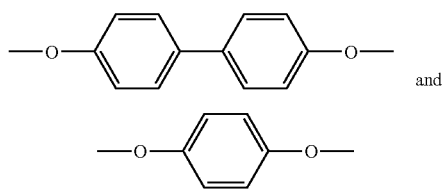

Recurring units (R2*) contain preferably at least one strong divalent electron withdrawing group linked on each of its ends to an arylene group, in particular a p-phenylene group. The divalent electron withdrawing group is preferably chosen from the sulfone group [—S(=O)$_2$—], the carbonyl group [—C(=O)—], the vinylene group [—CH=CH—], the sulfoxide group [—S(=O)—], the azo group [—N=N—], saturated fluorocarbon groups like —C(CF$_3$)$_2$—, organic phosphine oxide groups [—P(=O)(=R$_h$)—, where R$_h$ is a hydrocarbyl group] and the ethylidene group [—C(=CA$_2$)-, where A can be hydrogen or halogen]. More preferably, the divalent electron withdrawing group is chosen from the sulfone group and the carbonyl group. Still more preferably, recurring units (R2*) are chosen from:

(i) recurring units of formula:

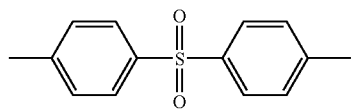

(ii) recurring units of formula:

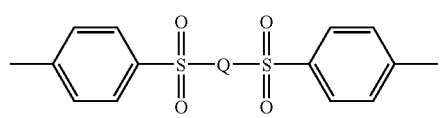

wherein Q is a group chosen from:

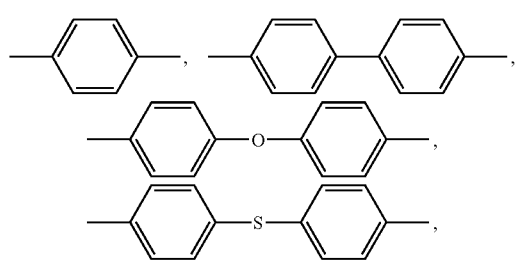

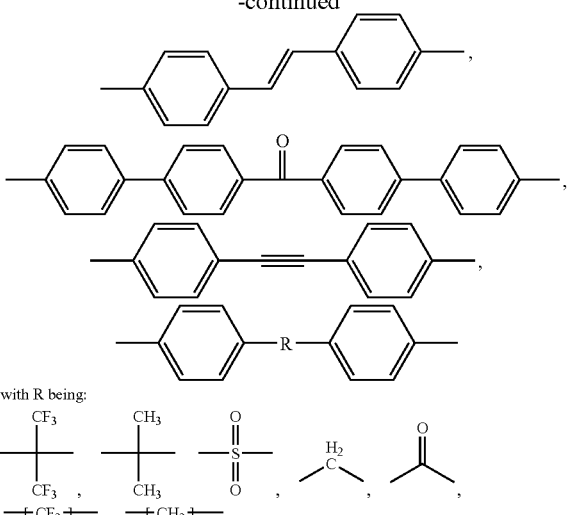

with R being:

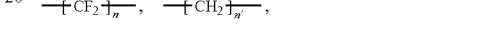

with n being an integer from 1 to 6 and n' being an integer from 2 to 6,

Q being preferably chosen from

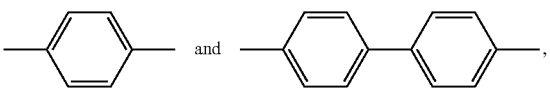

(iii) recurring units of formula:

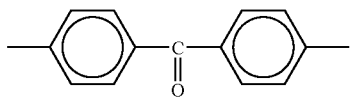

(iv) recurring units of formula:

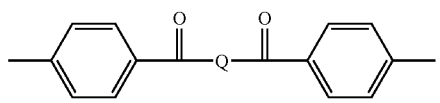

with Q as above defined for recurring units (ii).

Preferably more than 75 wt. % and more preferably more than 90 wt. % of the recurring units of the polyarylene (P2) are recurring units (R2). Still more preferably, essentially all, if not all, the recurring units of the polyarylene (P2) are recurring units (R2).

Excellent results were obtained when the polyarylene (P2) was a kinked rigid-rod polyphenylene copolymer, essentially all, if not all, the recurring units of which consisted of a mix of p-phenylene substituted by a phenylketone group with unsubstituted m-phenylene in a mole ratio p-phenylene:m-phenylene of from 10:90 to 70:30, preferably of from 25:75 to 65:35, more preferably of from 35:65 to 60:40, still more preferably of from 45:55 to 55:45, and most preferably of about 50:50. Such a kinked rigid-rod polyphenylene copolymer is commercially available from Solvay Advanced Polymers, L.L.C. as PRIMOSPIRE™ PR-250 polyphenylene.

The polyarylene (P2) has usually a number average molecular weight greater than 1000, preferably greater than 5000, more preferably greater than about 10000 and still more preferably greater than 15000. On the other hand, the number average molecular weight of the polyarylene (P2) is usually below 100000, and preferably below 70000. In a certain embodiment, the number average molecular weight of the polyarylene (P2) is above 35000. In another embodiment, it is of at most 35000; in this embodiment, it is often of at most 25000 and sometimes of at most 20000. The number average molecular weight of a polyarylene, in particular that of the polyarylene (P2), is advantageously determined by: (1) measuring a "relative" number average molecular weight of the polyarylene by Gel Permeation Chromatography (GPC) using polystyrene calibration standards, then (2) dividing the so-measured "relative" number average molecular weight by a factor 2. It is proceeded accordingly because the skilled in the art who is a specialist of polyarylenes knows that their "relative" number average molecular weight, as measured by GPC, are generally off by a factor of about 2 times; it has already been accounted for this correction factor in all the above cited lower and upper limits of molecular weight.

The polyarylene (P2) can be amorphous (i.e. it has no melting point) or semi-crystalline (i.e. it has a melting point). It is preferably amorphous.

The polyarylene (P2) has a glass transition temperature of advantageously above 50° C., preferably above 120° C. and more preferably above 150° C.

The polyarylene (P2) can be prepared by any method. Methods well known in the art to prepare the polyarylene (P2) are described notably in U.S. Pat. Nos. 5,227,457; 5,539,048; 5,565,543; 5,646,231; 5,654,392; 5,659,005; 5,668,245; 5,670,564; 5,721,335; 5,756,581; 5,760,131; 5,824,744; 5,827,927; 5,869,592; 5,886,130; and 6,087,467, the whole content of which is incorporated herein by reference. A suitable method for preparing the polyarylene (P2) comprises polymerizing, preferably by reductive coupling, (i) at least one dihaloarylene molecular compound consisting of an optionally substituted rigid rod-forming arylene group, which is linked on each of its two ends to one halogen atom, such as chlorine, bromine and iodine, with (ii) at least one dihaloarylene molecular compound consisting of an optionally substituted kink-forming arylene group, which is linked on each of its two ends to one halogen atom, such as chlorine, bromine, iodine, and fluorine. The elimination of the halogen atoms from the dihaloarylene molecular compounds results in the formation of respectively optionally substituted rigid rod-forming and optionally substituted kink-forming arylene groups.

Thus, for example:
the elimination of both chlorine atoms from a molecule of p-dichlorobenzene, p-dichlorobiphenyl or their homologous of general formula Cl-$(\phi)_N$-Cl, N being an integer from 3 to 10, results in the formation of respectively 1, 2 or N adjacent p-phenylene units (rigid rod-forming arylene units); thus, p-dichlorobenzene, p-dichlorobiphenyl and their homologous of general formula Cl-$(\phi)_N$-Cl, N as above defined, can be polymerized, so as to form p-phenylene units;
2,5-dichlorobenzophenone (p-dichlorobenzophenone) can be polymerized, so as to form 1,4-(benzoylphenylene) units (also rigid rod-forming arylene units);
m-dichlorobenzene can be polymerized, so as to form m-phenylene units (kink-forming arylene units).

The blend (B) can comprise one and only one polyarylene (P2). Alternatively, it can comprise two, three, or even more than three polyarylenes (P2).

In the blend (B), the polyarylene (P2) can be in any form. Generally, the polyarylene (P2) is in a form other than fibers.

Preferably, the polyarylene (P2) is in at least one out of the two following forms:
polyarylene (P2) solubilized in a phase comprising aromatic polycarbonate (P1), possibly the matrix phase of the blend (B)
polyarylene (P2) forming a dispersing phase, possibly the matrix phase of the blend (B), said dispersing phase comprising, dispersed therein, aromatic polycarbonate (P1) at solubilized state;
and, possibly in addition, in one or more of the following forms:
nodules of polyarylene (P2) dispersed in a phase comprising aromatic polycarbonate (P1), possibly the matrix phase of the blend (B);
polyarylene (P2) forming a dispersing phase, possibly the matrix phase of the blend (B), said dispersing phase comprising, dispersed therein, nodules of aromatic polycarbonate (P1).
Very preferably, the polyarylene (P2) is in the form of:
polyarylene (P2) solubilized in a phase comprising aromatic polycarbonate (P1), possibly the matrix phase of the blend (B) and, possibly in addition, in the form of:
nodules of polyarylene (P2) dispersed in a phase comprising aromatic polycarbonate (P1), possibly the matrix phase of the blend (B)
wherein:
certain nodules of polyarylene (P2) may be free of aromatic polycarbonate (P1), and
certain other nodules of polyarylene (P2) may form themselves a dispersing phase, other than the matrix phase, comprising, dispersed therein, aromatic polycarbonate (P1) at solubilized state and/or in the form of sub-nodules.

Optional Ingredients of the Blend (B)

The blend (B) may further contain a variety of other polymers, additives, fillers, and the like, collectively called ingredients. Conventional ingredients of aromatic polycarbonate and polyarylene compositions include fibrous reinforcing agents, particulate fillers and nucleating agents such as talc and silica, adhesion promoters, compatibilizers, curing agents, lubricants, metal particles, mold release agents, organic and/or inorganic pigments like $TiO_2$ and carbon black, dyes, flame retardants, smoke-suppressing agents, heat stabilizers, antioxidants, UV absorbers, tougheners such as rubbers, plasticizers, anti-static agents, melt viscosity depressants such as liquid crystalline polymers and the like.

In general, the weight of said optional ingredients, based on the total weight of the blend (B), is advantageously below 75%, preferably below 50%, more preferably below 25% and still more preferably below 10%. Excellent results were obtained when the blend (B) was essentially free, or even was completely free, of said optional ingredients.

In a particular embodiment, the blend (B) may further contain a fibrous reinforcing agent, especially an inorganic fibrous reinforcing agent such as glass fiber and carbon fiber. Thus, in said particular embodiment, the blend (B) comprises from 10 to 50 wt. %, in particular from 20 to 30 wt. %, of a reinforcing agent (all percentages based on the total weight of the blend); an example of such a blend is one composed of 35 wt. % of a kinked rigid-rod polyphenylene copolymer, 35 wt. % of an aromatic polycarbonate and 30 wt. % of glass fiber.

The Preparation of the Invented Blend

The blend (B) can be prepared by any method.

An aspect of the present invention is directed to a method for preparing the blend (B) as above described which comprises melt mixing at least one aromatic polycarbonate (P1) with at least one polyarylene (P2).

The melt mixing of the polyarylene (P2) with the aromatic polycarbonate (P1) can be achieved by any appropriate means. The melt mixing is advantageously made under a sufficiently high shear, so as to achieve a high degree of mixing of both polymers in the blend (B) ("shear-mixing"). The melt mixing can notably be achieved in a desirable manner by extruding the aromatic polycarbonate (P1) with the polyarylene (P2), so as to obtained strands of the blend (B). Very preferably, the so-obtained strands are then chopped into pellets.

The invented method preferably further comprises the step of dry mixing the aromatic polycarbonate (P1) with the polyarylene (P2), both preferably in powder or in granular form, prior to the melt mixing step.

End Uses of the Invented Blend

As previously mentioned, another aspect of the present invention is directed to a shaped article or a part of a shaped article comprising the blend (B) as above described.

Non limitative examples of shaped articles or part of shaped articles in accordance with the present invention include:

Films

Many different methods may be used to form films. Either continuous or batch processes may be used.

Films may be formed from solution. The solution comprises generally an organic liquid (solvent), which dissolves advantageously the aromatic polycarbonate (P1) and the polyarylene (P2).

Films may also be formed from the melt of the blend (B). Films may be extruded from the melt through a slit. Films may be formed by blow extrusion.

Films may also be further processed by stretching and/or annealing. Special films such as bilayers, laminates, porous films, textured films and the like may be produced by techniques known in the art.

Films comprising the blend (B) may be oriented by stretching. Stretching along one dimension will result in uniaxial orientation. Stretching in two dimensions will give biaxial orientation. Stretching may be aided by heating near the glass transition temperature. Stretching may also be aided by plasticizers. More complex processes such as applying alternating cycles of stretching and annealing may also be used with the blends of the present invention.

Fibers

Fibers comprising the blend (B) may be formed by known techniques. They may be formed notably from solution, or from the melt of the blend (B).

Coatings

In contrast with films which are generally uncoated, coatings are usually coated on a substrate. The expression "coated on a substrate" should be understood in its common sense, i.e. that the coating forms a cover over the surface of a substrate, thereby without including any limitation as to the process used to achieve the coating. The surface of the substrate may be partly or completely covered by the coating.

The thickness of the coating is usually of at least 1 µm, preferably of at least 5 µm, more preferably of at least 10 µm, and still more preferably of at least 20 µm. Besides, the thickness of the coating is usually of at most 10000 µm, preferably of at most 1000 µm, more preferably of at most 500 µm. In certain embodiments, the thickness of the coating may be of no more than 200 µm, and even non more than 100 µm.

Coatings may be formed by known techniques, including but not limited to, powder coating, laminating preformed films, coating from solution or from the melt, and like methods.

An aspect of the present invention is an article comprising a substrate, onto which the coating as above described is coated.

A particular aspect of the present invention of particularly high technical interest is directed to the use of the coating as above described, for ablative insulation. Accordingly, the coating is coated on a substrate such as a metal, and the coating is submitted to an aggressive agent which destroys partly or completely the coating; the coating is then used as a "sacrificed" layer, to protect the substrate against the aggressive agent. A first type of aggressive agent is a body which is in relative motion with regard to the coating and rubs against it; the body is usually more abrasive than the coating itself. Another type of aggressive agent lies in flames, which may originate from uncontrolled or controlled fires, in particular from the deliberate combustion of fuels. Still another type of aggressive agent is chosen from chemicals. Combinations of these different types of aggressive agents are also encompassed.

Membranes

The blend (B) may be fabricated into membranes useful for separations of mixed gases, liquids and solids.

Other Shaped Articles or Parts of Shaped Articles

The blend (B) may also be fabricated into sheets, and various three-dimensional shaped articles and parts of shaped articles.

Various molding techniques may be used to form shaped articles from blend (B):

Molding Techniques

Powders, pellets, beads, flakes, reground material or other forms of the blend (B) may be molded, with or without liquid or other additives, premixed or fed separately. In particular embodiments, the blend (B) may be compression molded. Exact conditions may be determined by trial and error molding of small samples. Upper temperature limits may be estimated from thermal analysis such as thermogravimetric analysis. Lower temperature limits may be estimated from Tg as measured for example by dynamic mechanical thermal analysis (DMTA), differential scanning calorimetry (DSC), or like methods. The blend (B) can be injection molded. It is also desirable if the blend (B) can be remelted several times without degradation, so that regrind from molding processes can be used. One skilled in the art will recognize that other factors also influence injection moldability including the material's stress relaxation properties and the temperature dependence of melt viscosity.

Extrusion Techniques

The blend (B) can also be extruded. Non-limiting examples include angle, channel, hexagonal bar, hollow bar, 1-beam, joining strip, tubes, rectangular tube, rod, sheet, plate, square bar, square tube, T-section, thin-walled tubes, microtubes, strands, rectangular strands, or other shapes as is required for a particular application. Related to extrusion is pultrusion, wherein a fiber reinforcement, such as glass or carbon fiber, is continuously added to a matrix of extruded blend (B) at molten state; composites with exceptional moduli and compressive strength will result.

Thermoforming

Sheet stock may be cut, stamped, welded, or thermally formed. For example, printed wiring boards may be fabricated from sheet or thick films by a process wherein copper is deposited on to one or both sides, patterned by standard photolithographic methods, etched, then holes are drilled, and several such sheets laminated together to form a finished board. Sheet and film may also be thermoformed into any variety of housings, cabinets, containers, covers, chassis, plates, panels, fenders, hoods, and the like.

The Unexpected Merits of the Invention

In spite of substantial discrepancies in their molecular structure, the polyarylene (P2) and the aromatic polycarbonate (P1) contained in the blend (B) exhibit good compatibility with each other, in substantial progress when compared to the prior art aromatic polycarbonate-polyarylene blends; they are in general at least partially miscible with each other, the miscible portion of both polymers forming then a single phase [(P2) being solubilized in (P1) or the contrary, depending on the relative amounts of both polymers].

Also surprisingly, the blend (B) exhibits an excellent balance of properties, including:
high strength, higher than that of prior art neat aromatic polycarbonates;
high stiffness, as high as that of prior art neat aromatic polycarbonates;
high environmental stress cracking resistance, higher than that of prior art neat aromatic polycarbonates and that of prior art aromatic polycarbonate-polyarylene blends;
fire resistance properties in progress with regard to those of the prior art aromatic polycarbonate-polyarylene blends;
impact resistance properties in progress with regard to those of the prior art aromatic polycarbonate-polyarylene blends, ideally approaching by certain aspects that of the neat aromatic polycarbonates;
at fixed level of polyarylene in the blends, elongation properties in progress with regard to those of the prior art aromatic polycarbonate-polyarylene blends;
good melt processability, in substantial progress when compared to that of the prior art aromatic polycarbonate-polyarylene blends.

In a preferred embodiment of the present invention, the blend (B) is suitable for use in certain applications of the most demanding industries, such as commercial aviation and other civil transport, then offering:
very high strength, higher than that of prior art neat aromatic polycarbonates and that of the prior art aromatic polycarbonate-polyarylene blends;
very high fire resistance properties, higher than that of prior art neat aromatic polycarbonates and that of the prior art aromatic polycarbonate-polyarylene blends.

Embodiment (E*)

In a particular embodiment (E*) of the present invention, the aromatic polycarbonate (P1) has a room temperature notched Izod impact strength or value greater than about 10 ft-1b/in (as measured by ASTM D256-00) and has a ratio of notched Izod strength value at room temperature to notched Izod impact value at about −40° C. of less than about 4.

The blend (B) according to embodiment (E*) is notably suitable for the preparation of ammunition articles comprising a cartridge casing, wherein (i) the casing is comprised of the blend (B), or (ii) the casing is comprised of two or more pieces or portions and at least one portion of the casing is comprised of the blend (B). The polyarylene (P2) improves the creep and viscoelastic relaxation resistance of the aromatic polycarbonate (P1).

Example of aromatic polycarbonates in accordance with embodiment (E*) include but are not limited to siloxane-modified Bisphenol-A polycarbonates (S-PC, for example, provided under the Trademark Lexan® EXL 9330 by General Electric Company—GE Plastics, GE Plastics Datasheet, Lexan® EXL 9330 (5 pages) (D 1997-2003)); and polycarbonates containing biphenyl linkages (B-PC, for example, provided under the Trademark Makrolon® DP1-1848 by Bayer Polymers LLC of Pittsburgh Pa., Bayer Polymers Datasheet, Makrolon® DPI-1848 (4 pages) (dated May 2003)). The aromatic polycarbonate energy-absorbing capabilities, as measured by the notched Izod testing (ASTM D256, room temperature of 23° C., same as above) are of 15 ft-1b/in as concerns S—PC and 13 ft-1b/in as concerns B-PC; further, each of S-PC and B-PC has a ratio of notched Izod strength value at room temperature to notched Izod impact value at about −40° C. well below 4.

In embodiment (E*), the polyarylene (P2) may meet all the characteristics of the polyphenylenes described or incorporated by reference in U.S. patent application Ser. No. 11/074,616, filed Mar. 7, 2005, the whole content of which is herein incorporated by reference, as long as these characteristics are compatible with those of the polyarylene (P2) described in the present document. Precisely, the polyphenylene polymers and copolymers incorporated by reference in U.S. patent application Ser. No. 11/074,616 have any of the compositions described by Marrocco et al. in U.S. Pat. Nos. 5,227,457; 5,539,048; 5,565,543; 5,646,231; 5,654,392; 5,659,005; 5,668,245; 5,670,564; 5,721,335; 5,756,581; 5,760,131; 5,824,744; 5,827,927; 5,869,592; 5,886,130; and 6,087,467, all being themselves incorporated by reference in the present document.

In embodiment (E*), while the polymers could be blended in any proportions, the amount of the polyarylene (P2) is to be balanced so that the ductility of the resulting blend is sufficient to serve as an ammunition casing material. Non-limiting examples of amounts of polyarylene (P2) are about 50% by weight, more preferably about 25%, even more preferably about 15%, yet more preferably about 10%, even more preferably about 5%. Amounts less than 2.5%, less than 1%, or even less than 0.1% may have sufficient effect on mechanical properties as to be useful for the practice of embodiment (E*). No lower limit of the percent of polyarylene (P2) is implied.

As an example, ammunition cartridges caselets may be injection molded from a blend of siloxane-modified Bisphenol-A polycarbonate and a polyarylene (P2). As another example, ammunition cartridge caselets may also be injection molded from a blend of Bisphenol-A polycarbonate with biphenyl linkages and a polyarylene (P2).

The person skilled in the art will understand that the invention is not intended to be limited to this particular embodiment (E*), but encompasses also any embodiment other than (E*) which is described in the present document.

Besides, various modifications to the embodiments described in the present document will be readily apparent to those skilled in the art, and the generic principles defined herein may be applied to other embodiments without departing from the spirit and scope of the invention; thus, this invention is also not intended to be limited to all the embodiments shown, but is to be accorded the widest scope consistent with the principles and features disclosed herein.

EXAMPLES

The present invention is described in greater detail below by referring to the examples; however, the present invention is not limited to these examples.

The polymers that were used are:
a bisphenol A polycarbonate homopolymer, commercially available from General Electric as LEXAN® 104 polycarbonate, a polyphenylene copolymer essentially all, if not all, the recurring units of which consisted of a mix of p-phenylene substituted by a phenylketone group with unsubstituted m-phenylene in a mole ratio p-phenylene:m-phenylene of about 85:15, commercially available from Solvay Advanced Polymers, L.L.C. as PRIMOSPIRE™ PR-120 polyphenylene, and a polyphenylene copolymer essentially all, if not all, the recurring units of which consisted of a mix of p-phenylene substituted by a phenylketone group with unsubstituted m-phenylene in a mole ratio p-phenylene:m-phenylene of about 50:50, commercially available from Solvay Advanced Polymers, L.L.C. as PRIMOSPIRE™ PR-250 polyphenylene.

The blends according to the present invention [(E1) and (E2)], the comparative blends [(CE1) and (CE2)], as well as the neat polycarbonate control [(CE0)], were compounded on a Berstorff 25 mm twin-screw co-rotating intermeshing extruder. In the case of the neat polycarbonate control (CE0), the compounding step was to convert the resin from powder to pellet form and to impart the same heat history seen by the blends on the base polymer.

First Set of Experimental Results

Mechanical Properties

Mechanical property tests were conducted per the ASTM methods indicated using 3.2 mm-thick ASTM specimens.

The results that were obtained are presented in table 1 below.

TABLE 1

| | ASTM Method | (CE0) | (CE1) | (E1) | (CE2) | (E2) |
|---|---|---|---|---|---|---|
| Mechanical Properties | | | | | | |
| LEXAN ® 104 polycarbonate (parts by weight) | | 100 | 90 | 90 | 80 | 80 |
| PRIMOSPIRE ™ PR-120 polyphenylene (parts by weight) | | 0 | 10 | 0 | 20 | 0 |
| PRIMOSPIRE ™ PR-250 polyphenylene (parts by weight) | | 0 | 0 | 10 | 0 | 20 |
| Strength. | | | | | | |
| Tensile strength (psi) | D-638 | 8900 | 9400 | 10200 | 10300 | 11600 |
| Flexural Strength (psi) | D-790 | 13000 | 14400 | 14900 | 16100 | 17100 |
| Stiffness | | | | | | |
| Tensile Modulus (ksi) | D-638 | 310 | 360 | 360 | 430 | 420 |
| Flexural Modulus (ksi) | D-790 | 350 | 400 | 400 | 460 | 460 |
| Impact properties | | | | | | |
| No-Notch Izod break | D-4812 | no break | no break | 20% breaks | no break | No break |
| Penetration impact Dynatup ® test - Total energy absorbed (ft-lb) | D-3763 | 55 | 29 | 44 | 19 | 34 |
| Penetration impact Dynatup ® test - Maximum load (lb) | D-3763 | 1550 | 1190 | 1490 | 1120 | 1360 |
| Penetration impact Dynatup ® test - Ductile breaks (%) | D-3763 | 100 | 80 | 100 | 0 | 80 |
| Penetration impact Dynatup ® test - Brittle breaks (%) | D-3763 | 0 | 20 | 0 | 100 | 20 |
| Elongation properties | | | | | | |
| Tensile elongation at yield (%) | D-638 | 6.4 | 5.4 | 6.0 | 4.8 | 5.6 |
| Tensile elongation at break (%) | D-638 | 68 | 54 | 68 | 36 | 42 |

Both blends (E1) and (E2) (according to the invention) exhibited an excellent balance of properties. Out of blends (E1) and (E2), the more performing one, from a global point of view, is blend (E2).

Second Set of Experimental Results.

Environmental stress cracking resistance to isopropanol at room temperature after 24 hours immersion exposure.

The results are shown in table 2.

|  | (CE0) | (CE1) | (E1) | (CE2) | (E2) |
|---|---|---|---|---|---|
| LEXAN ® 104 polycarbonate (parts by weight) | 100 | 90 | 90 | 80 | 80 |
| PRIMOSPIRE ™ PR-120 polyphenylene (parts by weight) | 0 | 10 | 0 | 20 | 0 |
| PRIMOSPIRE ™ PR-250 polyphenylene (parts by weight) | 0 | 0 | 10 | 0 | 20 |
| ESCR data |  |  |  |  |  |
| Critical Strain (%) | 1.17 | 1.17 | 1.46 | 1.03 | 1.35 |
| Critical stress (psi) | 3700 | 4300 | 5300 | 4400 | 5600 |

Third Set of Experimental Results.

Properties related to tire resistance.

The UL 94 Vertical Burn Method was used. The results are shown in table 3.

TABLE 3

Properties related to fire resistance

|  | (CE0) | (CE1) | (E1) | (CE2) | (E2) |
|---|---|---|---|---|---|
| LEXAN ® 104 polycarbonate (parts by weight) | 100 | 90 | 90 | 80 | 80 |
| PRIMOSPIRE ™ PR-120 polyphenylene (parts by weight) | 0 | 10 | 0 | 20 | 0 |
| PRIMOSPIRE ™ PR-250 polyphenylene (parts by weight) | 0 | 0 | 10 | 0 | 20 |
| Burn times |  |  |  |  |  |
| Total burn time (10 specimens) (s) | 145 | 208 | 156 | 174 | 92 |
| Longest $T_1$ (s) | 28 | 52 | 35 | 64 | 16 |

The shorter the total burn time and the longest burn time $T_1$ (time after $1^{st}$ 10 second exposure to the flame), the better.

The invention claimed is:

1. A blend (B) comprising:
   at least one aromatic polycarbonate (P1), and
   at least one polyarylene (P2), more than 50 wt. % of the recurring units thereof are optionally substituted arylene groups (recurring units (R2)), each of said recurring units (R2)) being linked by each of its two ends to two other optionally substituted arylene groups via a direct C—C linkage, and said recurring units (R2) being a mix (M) consisting of:
   about 50 mole %, based on the total number of moles of recurring units (R2), of rigid rod-forming arylene units (R2a), optionally substituted by at least one monovalent substituting group, with
   about 50 mole %, based on the total number of moles of recurring units (R2), of kink-forming arylene units (R2b), optionally substituted by at least one monovalent substituting group;
   wherein the weight of the polyarylene (P2), based on the combined weight of the aromatic polycarbonate (P1) and the polyarylene (P2), ranges from 5% to 25%.

2. The blend of claim 1, wherein the weight of the polyarylene (P2), based on the combined weight of the aromatic polycarbonate (P1) and the polyarylene (P2), is at least 10%.

3. The blend of claim 1, wherein the combined weight of the aromatic polycarbonate (P1) and the polyarylene (P2), based on the total weight of the blend (B), is above 95%.

4. The blend of claim 3, wherein the weight of the polyarylene (P2), based on the combined weight of the aromatic polycarbonate (P1) and the polyarylene (P2), ranges from 10% to 20%.

5. The blend of claim 1, wherein:
   the rigid rod-forming arylene units (R2a) are chosen from p-phenylenes optionally substituted with at least one monovalent substituting group, and
   the kink-forming arylene units (R2b) are chosen from:
   (i) m-phenylenes optionally substituted with at least one monovalent substituting group, and
   (ii) mixes of m-phenylenes with o-phenylenes, wherein both the m-phenylenes and the o-phenylenes are, independently from each other, optionally substituted with at least one monovalent substituting group.

6. The blend of claim 5, wherein the rigid rod-forming arylene units (R2a) are p-phenylenes substituted by a phenylketone group.

7. The blend of claim 5, wherein the kink-forming arylene units (R2b) are unsubstituted m-phenylenes.

8. The blend of claim 1, wherein more than 50 wt. % of the recurring units of the aromatic polycarbonate (P1) are recurring units (R1), said recurring units (R1) being selected from the group consisting of recurring units obtained by the polycondensation reaction of phosgene and at least one aromatic diol (D1):

$$Cl\!-\!\underset{\underset{O}{\|}}{C}\!-\!Cl \;+\; OH\text{-}\rho\text{-}OH \;\longrightarrow\; -\!O\!-\!\underset{\underset{O}{\|}}{C}\!-\!O\text{-}\rho\text{-}$$

phosgene   diol (D1)   recurring unit (R1)

wherein ρ is a $C_6$-$C_{50}$ divalent radical.

9. The blend of claim 8, wherein the aromatic diol (D1) is selected from the group consisting of aromatic diols of structural formulae (I) and (II):

(I)

(II)

wherein:
A is selected from the group consisting of a $C_1$-$C_8$ alkylene, a $C_2$-$C_8$ alkylidene, a $C_5$-$C_{15}$ cycloalkylenes, a $C_5$-$C_{15}$ cycloalkylidene, a carbonyl group, an oxygen atom, a sulfur atom, —SO—, —SO$_2$—, and radicals of formula:

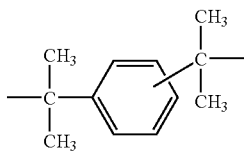

Z is selected from the group consisting of (s-1) $C_1$-$C_{20}$ alkyls, (s-2) $C_5$-$C_{15}$ cycloalkyls, (s-3) $C_1$-$C_{20}$ aryls, (s-4) $C_1$-$C_{20}$ alkylaryls, (s-5) $C_1$-$C_{20}$ aralkyls, (s-6) $C_1$-$C_{20}$ alkenyls, halogens, the partially halogenated homologous of radicals (s-1), (s-2), (s-3), (s-4), (s-5) and (s-6), and the perhalogenated homologous of radicals (s-1), (s-2), (s-3), (s-4), (s-5) and (s-6); if several Z radicals are substituents, said Z radicals are either identical or different from one another; and wherein:
e denotes an integer from 0 to 1;
g denotes an integer from 0 to 1;
d denotes an integer from 0 to 4; and
f denotes an integer from 0 to 3.

10. The blend of claim 9, wherein the aromatic diol (D1) is 2,2-bis-(4-hydroxyphenyl)-propane (bisphenol A).

11. The blend of claim 8, wherein the aromatic polycarbonate (P1) consists essentially of recurring units (R1).

12. A method for preparing the blend of claim 1, said method comprising melt mixing the at least one aromatic polycarbonate (P1) with the at least one polyarylene (P2).

13. The method for preparing the blend of claim 12, said method comprising extruding the aromatic polycarbonate (P1) with the polyarylene (P2), so as to obtain strands of the blend (B).

14. A shaped article or part of a shaped article comprising the blend of claim 1.

15. The shaped article or part of a shaped article according to claim 14, which is selected from a film, a fiber, a coating, a membrane, and a sheet.

16. A method for preparing the shaped article or part of a shaped article of claim 14, said method comprising injection molding the blend (B).

* * * * *